United States Patent Office

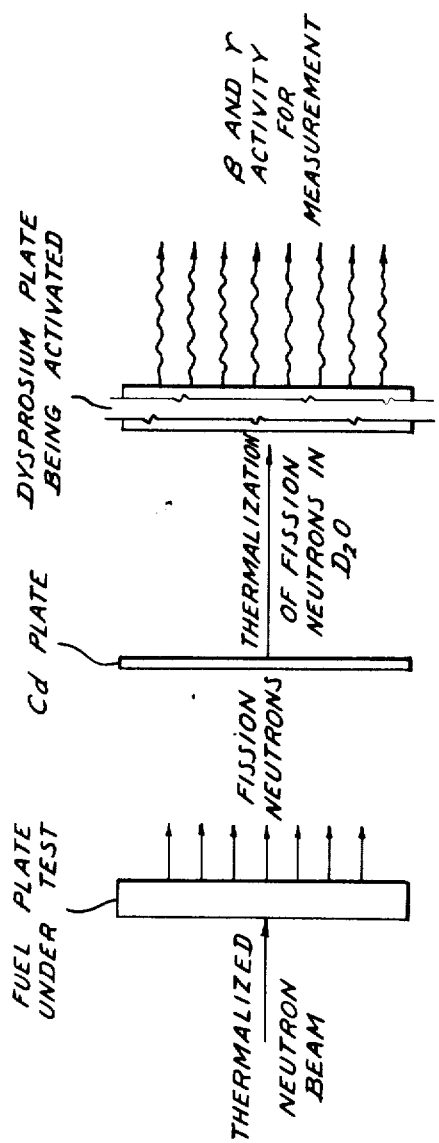

3,436,538
Patented Apr. 1, 1969

---

3,436,538
METHOD FOR MEASURING FISSIONABLE MATERIAL CONTENT OF FUELS
Demetrios L. Basdekas, San Antonio, Tex., assignor, by mesne assignments, to the United States of America as represented by the United States Atomic Energy Commission
Filed Feb. 1, 1966, Ser. No. 523,997
Int. Cl. G01t 3/00
U.S. Cl. 250—83.1   5 Claims

ABSTRACT OF THE DISCLOSURE

The present invention relates to a method of measuring the content of fissionable material in nuclear fuel wherein a thermal neutron beam is directed to the fuel plate. The thermal neutrons of the original beam transmitted through the fuel plate are eliminated by a neutron absorbing material and the fission neutrons produced in the fuel are thermalized to then activate a dysprosium plate thereby causing decay which emits beta and gamma radiation for measurement.

---

The present invention relates to an improved method of indirectly assaying nuclear fuel and more particularly to a non-destrutcive assay method wherein a thermal neutron beam is directed to the fuel plate under test and fission neutrons are thermalized to activate a dysprosium plate for radiation measurement whereby fuel content of the fuel plate under test may be determined.

The invention described herein was made or conceived in the course of or under a contract with the United States Atomic Energy Commission.

It is highly desirable to non-destructively measure the fissionable material content of both irradiated or hot and un-irradiated or cold nuclear fuels with accuracy and precision. The fissionable material content of hot fuels is important in determining efficiency of reactor operations by comparing the amount of work produced to the fuel consumed as well as determining where burn-up occurs within a fuel element and when to replace fuel elements. In addition, determination of fissionable material content of cold nuclear fuels is important in loading reactors since the total amount of fissionable material and its homogeneity is critical. Of course, knowledge of fissionable material content of nuclear fuels is important for operational safety, management and accounting of fissionable materials.

Conventional methods of assaying nuclear fuel and particularly uranium include chemical analysis and gamma ray scintillation spectrometry. However, chemical analysis is difficult and costly and involves destruction of the nuclear fuel under test which is obviously undesirable in most instances. Gamma ray scintillation spectrometry has been used for the determination of the $U^{235}$ and $U^{238}$ content of cold reactor fuel elements as well as burn-up of hot fuels by measuring activity. However, such determination is dependent in the latter situation on the history of the fuel element operation. Operational history and activity cannot be correlated with a great degree of accuracy so it is apparent that an assay method capable of suitable accuracy would be highly advantageous. The present invention is directed to such a method.

It is, therefore, an object of the present invention to provide an improved method of assaying nuclear fuel by non-destructive means.

A further object of the present invention is the provision of a non-destructive method of assaying nuclear fuel with a high degree of accuracy.

Another object of the present invention is the provision of an accurate method for non-destructively measuring the amount of $U^{235}$ in cold fuel plates containing both $U^{235}$ and $U^{238}$.

Still another object of the present invention is the provision of an accurate method for non-destructively measuring the amount of $U^{235}$ burn-up in a hot fuel plate containing both $U^{235}$ and $U^{238}$.

Yet a further object of the present invention is the provision of an accurate method for assaying uranium fuel by subjecting it to a thermal neutron beam, thermalizing the fission neutrons to activate a dysprosium plate and measuring the resulting activity.

Other and further objects, features and advantages will be apparent from the following description of a presently preferred embodiment of the invention, given for the purpose of disclosure and taken in conjunction with the accompanying drawing showing means for non-destructively assaying nuclear fuel.

The improved method of non-destructively assaying nuclear fuel in the present invention generally comprises directing a thermal neutron beam on the fuel plate under test which contains an unknown amount of $U^{235}$. The thermal neutrons of the original beam transmitted through the fuel plate are eliminated by use of a cadmium plate and the fission neutrons produced in the plate are then thermalized. Such thermalized fission neutrons then activate a dysprosium plate causing decay which emits beta and gamma radiation capable of measurement. The decay activity is proportional to fuel content of the plate under test which may be determined by a proper correlation.

When $U^{235}$ is bombarded with thermal neutrons, part of the neutrons are absorbed by the $U^{235}$ nuclei and cause the $U^{235}$ to fission. Each fission produces fission product nuclei and either two or three fission neutrons (average 2.5 neutrons). By detecting these fission neutrons, the number of fissions and hence the amount of $U^{235}$ can be determined such as by the method of the present invention as generally shown in the drawing. Of course, if the $U^{235}$ is contained in a mixture of $U^{235}$ and other elements, allowance must be made for the absorption of thermal neutrons by the other elements.

With reference to the drawing, the fuel plate under test is for example a typical mixture of $U^{235}$ and $U^{238}$. The thermalized neutron beam may be emitted by a neutron generator having as an example an output of $2.5 \times 10^{11}$ fast neutrons (14 mev.) per second when the generator is operated at a 2.5 milliampere beam current at 150 kilovolts. These fast neutrons can be thermalized by suitable means such as placing the target end of the generator in the center of a cubicle of water so that the resulting beam is on the order of $5 \times 10^8$ to $10^9$ thermal neutrons/cm.$^2$/second.

If the fuel plate under test contains $U^{235}$ and $U^{238}$, both $U^{235}$ and $U^{238}$ will absorb the thermal neutrons in the original beam. The $U^{235}$ will either become $U^{236}$ or will fission. The number of absorbed thermal neutrons which cause the $U^{235}$ to fission can be determined by comparing the fission cross-section of the $U^{235}$ to the total absorption cross-section of $U^{235}$ and $U^{238}$ mixture as will be explained hereafter.

As shown in the drawing, the thermal neutrons of the original beam transmitted through the fuel plate under test are eliminated by the use of a suitable cadmium plate. Other elements having high neutron capture cross-sections may also be used to reduce the number of neutrons in the original thermalized neutron beam passing through the fuel plate under test.

The fission neutrons from the fuel plate being inspected may be thermalized such as by heavy water ($D_2O$) or water ($H_2O$). Heavy water is preferable for the moderating material because its moderation characteristics provide a good compromise between neutron absorption and loss of neutrons because of geometry. Both heavy water and water have low neutron absorption cross-section and large quantities are not required for neutron thermalization. If large quantities of a moderating material were required, the loss of neutrons would be large because of the inverse square relation between distance and flux.

After thermalization, the fission neutrons are allowed to strike a dysprosium plate causing activation of $Dy^{164}$ which becomes $Dy^{165m}$ with emission of beta and gamma radiation which may be detected by suitable means. For example, gamma radiation may be detected and counted by a scintillation detector. The number of gammas counted in a specified length of time is proportional to the incident flux of thermalized fission neutrons which in turn is proportional to the $U^{235}$ content of the fuel plate under test.

Alternatively, a detection method which provides a permanent record of the information extracted is autoradiography whereby fuel content of the plate under test may be determined from film density after the film has been developed under standard conditions. A calibration curve of the film density versus fuel content may be established experimentally.

If the fuel under test has been used in a reactor, there will be $U^{235}$ fission, products, $Pu^{239}$, $Pu^{239}$ fission products and $U^{236}$ in the fuel in addition to the $U^{235}$ and $U^{238}$. The $Pu^{239}$ is produced when a $U^{238}$ nucleus absorbs a neutron, becomes radioactive, and decays to $Np^{239}$, which decays to $Pu^{239}$. The $Pu^{239}$ nuclei may then absorb neutron and fission, producing $Pu^{239}$ fission products and neutrons. As these other products are produced by the $U^{235}$ and $U^{238}$, the amount of $U^{235}$ and $U^{238}$ decreases. The percent decrease of $U^{235}$ and $U^{238}$ in a reactor depends on the absorption cross-sections of $U^{235}$ and $U^{238}$ and the power produced by the reactor. The decrease of $U^{235}$ and $U^{238}$ content and production of other elements must be considered when the $U^{235}$ content of hot (reactor irradiated) fuel plates is determined.

To illustrate the present invention in nuclear fuel assay, the following examples indicate through calculations the application of the method of the invention. The fuel plates under test are assumed to be 24⅝ inches by 2.8 inches by 0.060 inch wherein of the 0.060 inch dimension cladding thickness is assumed to be 0.010 inch total. The percent burn-up is assumed to be the percent loss of $U^{235}$ as compared to the original amount of $U^{235}$ in the fuel plate.

Example I

Assume that a 90.00% enriched, cold fuel plate is to be assayed by use of a neutron generator operating at 150 kv. potential and 2.5 ma. deuteron beam current having an output of $2.5 \times 10^{11}$ neutrons/sec. over $4\pi$ geometry. Thermalization of these neutrons by a 4-foot cubicle of water will produce a thermal neutron flux of $5 \times 10^8$ to $10^9$ thermal neutrons/cm.²/sec.

If $5 \times 10^8$ thermal neutrons/cm.²/sec. are incident on a 2.8 inch × 2.8 inch (50 cm.²) area of the fuel plate, the total number of neutrons per second striking the plate is approximately $2.5 \times 10^{10}$.

Of the $2.5 \times 10^{10}$ thermal neutrons/sec. striking the plate the number which will be absorbed in the plate is $$N = N_0(1 - e^{-\Sigma_a^f t})$$

where $N_0$=number of thermal neutrons incident on the plate per second
$N$=number of thermal neutrons absorbed in the plate per second
$\Sigma_a^f$=total macroscopic absorption cross-section of the fuel (cm.$^{-1}$)
$t$=thickness of the fuel in the plate (0.050 in.=0.127 cm.)

The absorption of the cladding is neglected since its thermal neutron absorption cross-section is considerably less than that of the uranium.

The macroscopic thermal neutron absorption cross-section of the fuel is $$\Sigma_a^f = \Sigma_a^{235} + \Sigma_a^{238}$$

where $\Sigma_a^{235}$=macroscopic thermal neutron absorption cross-section of $U^{235}$ in the fuel
$\Sigma_a^{238}$=macroscopic thermal neutron absorption cross-section of $U^{238}$ in the fuel The macroscopic thermal neutron absorption cross-section is related to the microscopic cross-section by the equation $$\Sigma_a = N' \sigma_a$$

where $N'$=number of atoms of the material present
$\sigma_a$=microscopic thermal neutron absorption cross-section.

Thus for 90.00% enriched fuel $$\Sigma_a^{235} = \sigma_a^{235} \frac{N_A \rho_u}{235} (0.9000)$$

where $N_A$=Avogadro's number (atoms/mole)
$\rho_u$=density of uranium (grams/cm.³)
235=atomic weight of $U^{235}$ (grams/mole)

Likewise for 90.00% enriched fuel $$\Sigma_a^{238} = \sigma_a^{238} \frac{N_A \rho_u}{238} (0.1000)$$

Substituting the numerical values for $\sigma_a^{235}$, $\sigma_a^{238}$, $N_A$, and $\sigma_u$ $$\Sigma_a^{235} = (692 \times 10^{-24} \text{ cm.}^2/\text{nucleus}) \times$$
$$\frac{(6.023 \times 10^{23} \text{ atoms/mole})(18.8 \text{ g./cm.}^3)(0.9000)}{235 \text{ g./mole}}$$
$$= 30.0090 \text{ cm.}^{-1}$$

$$\Sigma_a^{238} = (2.8 \times 10^{-24} \text{ cm.}^2/\text{nucleus} \times$$
$$\frac{(6.023 \times 10^{23} \text{ atoms/mole})(18.8 \text{ g./cm.}^3)(0.1000)}{238 \text{ g./mole}}$$
$$= 0.0133 \text{ cm.}^{-1}$$

and $$\Sigma_a^f = 30.0090 \text{ cm.}^{-1} + 0.0133 \text{ cm.}^{-1} = 30.0223 \text{ cm.}^{-1}$$

The number of thermal neutrons absorbed per second in the fuel plate is then $$N = N_0(1 - e^{-\Sigma_a^f t})$$
$$N = (2.5 \times 10^{10})(1 - e^{-30.0223 \times 0.127})$$
$$N = 2.4448 \times 10^{10} \text{ thermal neutrons/sec.}$$

Of the thermal neutrons absorbed in the fuel, only part of them will cause the $U^{235}$ to fission. The number of fission neutrons produced per thermal neutron absorbed is equal to the average number of fission neutrons produced per fission times the ratio of the fission cross-section to the absorption cross-section of the fuel.

$$\eta = \nu \frac{\Sigma_f^f}{\Sigma_a^f}$$

where $\eta$=fission neutrons produced per thermal neutron absorbed
$\nu$=fission neutrons produced per fission
$\Sigma_a^f$=macroscopic thermal neutron absorption cross-section of the fuel
$\Sigma_f^f$=macroscopic thermal neutron fission cross-section of the fuel Since the thermal neutron fission cross-section of $U^{238}$ is less than 0.5 millibarns, the thermal neutron fission cross-section of the fuel is essentially equal to the thermal neutron fission cross-section of $U^{235}$ in the fuel.

Hence the number of fission neutrons produced per thermal neutron absorbed in the fuel is $$\eta = \nu \frac{\Sigma_f^{235}}{\Sigma_a^f}$$

The thermal neutron fission cross-section of $U^{235}$ in 90.00% enriched fuel is $$\Sigma_f^{235} = \sigma_f^{235} \frac{N_A \rho_u}{235} (0.9000)$$

$$= (580 \times 10^{-24} \text{ cm.}^2/\text{nucleus})$$

$$\times \frac{(6.023 \times 10^{23} \text{ atoms/mole})(18.8 \text{ g./cm.}^3)(0.9000)}{235 \text{ g./mole}}$$

$$= 25.152 \text{ cm.}^{-1}$$

$\eta$ then is $$\eta = (2.5) \frac{25.152 \text{ cm.}^{-1}}{30.0090 \text{ cm.}^{-1}}$$

= 2.095 fission neutrons produced/absorption

The total number of fission neutrons per second produced in the fuel plate is $$N_f = N\eta$$

where $N_f$ = number of fission neutrons produced in the fuel per second
$N$ = number of thermal neutrons absorbed in the fuel per second
$\eta$ = number of fission neutrons produced per thermal neutron absorbed in the fuel Then
$$N_f = (2.4448 \times 10^{10})(2.095)$$
$$N_f = 5.1218 \times 10^{10} \text{ fission neutrons produced/sec.}$$

To eliminate the flux of thermal neutrons transmitted through the fuel plate, a cadmium sheet is inserted in the thermal beam between the fuel plate and the detector. If the cadmium sheet is 0.030 inch thick, the thermal neutron flux is reduced by a factor of $10^4$, but the fission neutron flux will be reduced by only 2%.

For simplification of calculations, assume that the fission neutrons are emitted by a plane disk of 50 cm.² area (radius=4 cm.) rather than a square plate of 50 cm.² area (2.8 inches=7.1 cm. on a side). The fission neutron flux at a point on the axis of a disk is approximately the same as the fission neutron flux at a point on the axis of a plate.

The equation of the flux on the axis of a disk is $$\Phi = \frac{S_A}{4} \log_e \left( \frac{R_0^2 + a^2}{a^2} \right) \text{ neutrons/cm.}^2/\text{sec.}$$

where $S_A$ = source strength (neutrons/cm.²/sec.)
$R_0$ = radius of the disk (cm.)
$a$ = distance from disk to point of measurement (cm.)

If the distance from the fuel plate to a dysprosium plate is 11 centimeters, the fission neutron flux at the plate would be $$\Phi = \frac{\frac{5.1218 \times 10^{10} \text{ neutrons/sec.}}{50 \text{ cm.}^2}}{4} \log_e \left[ \frac{(4 \text{ cm.})^2 + (11 \text{ cm.})^2}{(11 \text{ cm.})^2} \right]$$

$$\Phi = (2.5609 \times 10^8) \log_e \left( \frac{137}{121} \right)$$

$$\Phi = (2.5609 \times 10^8)(0.1242)$$
$$\Phi = 3.1806 \times 10^7 \text{ neutrons/cm.}^2/\text{sec.}$$

The total number of fission neutrons per second striking the dysprosium plate would be approximately equal to the neutron flux at the center of the dysprosium plate times the area of the dysprosium plate. Hence, the total number of fission neutrons striking a plate having an area of 50 cm.² would be $$\Phi_A = (3.1806 \times 10^7 \text{ neutrons/cm.}^2/\text{sec.})(50 \text{ cm.}^2)$$
$$\Phi_A = 1.5903 \times 10^9 \text{ neutrons/sec.}$$

In the above calculations fission neutrons have been considered as striking the dysprosium plate. In actuality, the fast fission neutrons will cause very little activation of the dysprosium. The region between the fuel plate and the dysprosium plate must contain a moderating material. In this case the moderator considered is heavy water, $D_2O$. The thermalization distance for fission neutrons in heavy water is 11 centimeters, which was used in the previous calculations.

Additional heavy water may be used around the path from the fuel plate to the dysprosium plate. This heavy water will act as a reflector to contain some of the thermalized neutrons which otherwise would diffuse from the beam.

Because the loss of fission neutrons from the beam is practically inestimatable generous allowance for this loss must be made with an assumption that the loss of neutrons from the beam reduces the neutron flux by a factor of 10.

If the thermal neutrons are allowed to strike a dysprosium plate, the production of radioactive $Dy^{165m}$ nuclei is given by $$dN_t = I_0(1 - e^{-\Sigma_a^{Dy} d}) dt$$

where $dN_t$ = number of $Dy^{165m}$ nuclei produced per increment of time ($dt$)
$I_0$ = number of thermal neutrons incident per second
$\Sigma_a^{Dy}$ = macroscopic thermal neutron activation cross-section of $Dy^{164}$ for $Dy^{165m}$ production (cm.$^{-1}$)
$d$ = dysprosium plate thickness (cm.)
$dt$ = incremental exposure time The decay of radioactive nuclei during the exposure of the dysprosium plate is given by $$\frac{dN_t}{N_t} = \lambda_{Dy} dt$$

where $N_t$ = total number of $Dy^{165m}$ nuclei present at any time ($t$)
$\lambda_{Dy}$ = decay constant of $Dy^{165m}$ = 0.00924 sec.$^{-1}$ Combining the concurrent rates of activation and decay and integrating to find the number of radioactive $Dy^{165m}$ nuclei present after an exposure time ($\tau$)

$$N_\tau = \frac{I_0}{\lambda_{Dy}} (1 - e^{-\Sigma_a^{Dy} d})(1 - e^{-\lambda_{Dy} \tau})$$

where $N_\tau$ = number of radioactive $Dy^{165m}$ nuclei present after exposure time ($\tau$)
$\tau$ = exposure time Thus, the number of thermal neutrons per second incident on the dysprosium plate is $$I_0 = \frac{1}{10} \times \Phi$$
$$I_0 = \frac{1}{10} (1.5903 \times 10^9)$$
$$I_0 = 1.5903 \times 10^8 \text{ thermal neutrons/sec.}$$

The macroscopic thermal neutron activation cross-section of $Dy^{164}$ for the production of $Dy^{165m}$ is $$\Sigma_a^{Dy} = \sigma_a^{Dy} \frac{N_A \rho_{Dy}}{164} (0.282)$$

where $\sigma_a^{Dy}$ = microscopic thermal neutron activation cross-section of $Dy^{164}$
$N_A$ = Avogadro's number (atoms/mole)
$\rho_{Dy}$ = density of dysprosium 164 = atomic weight of the activated target nuclei, dysprosium —164

0.282 = abundance of dysprosium —164 in natural dysprosium

Hence $\Sigma_a{}^{Dy} = (2600 \times 10^{-24} \text{ cm.}^2/\text{nucleus}) \times$ $$\frac{\left(6.023 \times 10^{23} \frac{\text{atoms}}{\text{mole}}\right)(8.56 \text{ g./cm.}^3)(0.282)}{164 \text{ g./mole}}$$

$= 23.0 \text{ cm.}^{-1}$

The decay constant for $Dy^{165m}$ is $$\lambda_{Dy} = \frac{\log_e 2}{T_{1/2}{}^{Dy}}$$

where $T_{1/2}{}^{Dy} =$ half-life of $Dy^{165m} = 75$ sec.

Then $$\lambda_{Dy} = \frac{0.693}{75 \text{ sec.}} = 0.00924 \text{ sec.}^{-1}$$

The number of radioactive $Dy^{165m}$ nuclei present after exposing a 0.02 centimeter thick dysprosium plate having an area of 50 cm.² for 20 seconds is then $$N_r = \frac{1.5903 \times 10^6}{0.00944}(1 - e^{-23.0 \times 0.02})(1 - e^{-0.00924 \times 20})$$

$N_r = (1.7211 \times 10^{10})(1 - 0.632)(1 - 0.832)$
$N_r = (1.7211 \times 10^{10})(0.368)(0.168)$
$N_r = 1.645 \times 10^9$ radioactive nuclei If the activated dysprosium plate is counted for one half-life (75 seconds), the total number of disintegrations counted for $2\pi$ geometry is $D = N_r C G$
$= (1.0645 \times 10^9 \text{ nuclei})(\frac{1}{2} \text{ decaying})(2\pi/4\pi \text{ geometry})$
$= 2.6612 \times 10^8$ counts where D = number of counts detected
C = fraction decaying
G = geometry factor It has been assumed that the detector is 100% efficient, which is essentially correct for scintillation detection of the low energy gamma radiation (108 kev.) emitted by $Dy^{165m}$.

The standard counting deviation for $2.6612 \times 10^8$ counts to 95% confidence is Percent Standard Deviation $= \frac{3}{\sqrt{D}} + 100\%$ $= \frac{3}{\sqrt{2.6612 \times 10^8}} \times 100\%$ $= \frac{3}{1.631 \times 10^4} \times 100\%$ $= 0.01839\%$ If the activated dysprosium plate is counted for 20 seconds, the total number of nuclei decaying in this time is $1.7884 \times 10^8$ nuclei. Thus $(1.7884 \times 10^8)(2\pi/4\pi) = 8.942 \times 10^7$ gammas will be emitted over $2\pi$ geometry, and may be counted by a detector.

The standard deviation in this case is

Percent Standard Deviation =

$\frac{3}{\sqrt{8.942 \times 10^7}} \times 100\% = 0.0317\%$

If the enrichment of the fuel plate were 90.02%, the activation would change by approximately 0.02/90.00 or 0.022%.

Since this change in activation is larger than the standard deviation for the technique using a 75-second counting time, a difference between 90.00% enrichment and 90.02% enrichment should be detectable in cold fuel plates.

Example II

Assume now that a 1.140% enriched cold fuel plate is to be assayed as in Example I.

The macroscopic thermal neutron absorption cross-section of $U^{235}$ in a 1.140% enriched fuel plate is $$\Sigma_a{}^{235} = \sigma_a{}^{235}\frac{N_A \rho_u}{235}(0.01140)$$

$= 0.3801 \text{ cm.}^{-1}$

The macroscopic thermal neutron absorption cross-section of $U^{238}$ in a 1.140% enriched fuel plate is $$\Sigma_a{}^{238} = \sigma_a{}^{238}\frac{N_A \rho_u}{238}(0.98860)$$

$= 0.1317 \text{ cm.}^{-1}$

The macroscopic thermal neutron absorption cross-section of the fuel is then $\Sigma_a{}^f = \Sigma_a{}^{235} + \Sigma_a{}^{238}$ $= (0.3801 + 0.1317) \text{ cm.}^{-1} = 0.5118 \text{ cm.}^{-1}$ The macroscopic thermal neutron fission cross-section of the fuel is $$\Sigma_f{}^f = \Sigma_f{}^{235} = \sigma_f{}^{235}\frac{N_A \rho_u}{235}(0.1140)$$

$= 0.3186 \text{ cm.}^{-1}$

The number of fission neutrons produced per thermal neutron absorbed in the fuel is $$\eta = \nu\frac{\Sigma_f{}^f}{\Sigma_a{}^f} = (2.5)\frac{0.3186 \text{ cm.}^{-1}}{0.5118 \text{ cm.}^{-1}}$$

$= 1.5563$ fission neutrons/thermal neutron absorbed in the fuel

The number of thermal neutrons per second absorbed in the fuel is $N = N_0(1 - e^{-\Sigma_a{}^f t})$ $= (2.5 \times 10^{10})(1 - e^{-0.5118 \times 0.127})$ $= 1.5730 \times 10^9$ thermal neutrons/sec.

The number of fission neutrons produced per second is then $N_f = N\eta$
$= (1.5730 \times 10^9)(1.5563)$
$= 2.4481 \times 10^9$ fission neutrons/sec.

The fission neutron flux at the dysprosium plate would be $$\Phi = \frac{S_A}{4}\log_e\frac{R_0{}^2 + a^2}{a^2}$$

$$= \frac{\frac{2.4481 \times 10^9 \text{ neutron/sec.}}{50 \text{ cm.}^2}}{4}\log_e\frac{(4 \text{ cm.})^2 + (11 \text{ cm.})^2}{(11 \text{ cm.})^2}$$

$= 1.52027 \times 10^6$ fission neutrons/sec.

The total number of fission neutrons per second striking the dysprosium plate would be $\Phi A = (1.52027 \times 10^6)(50 \text{ cm.}^2)$
$= 7.6013 \times 10^7$ fission neutrons/sec.

Allowing for neutron loss during thermalization, the number of thermalized neutrons per second striking the dysprosium plate is $I_0 = \frac{1}{10} \Phi A$
$= 7.6013 \times 10^6$ thermal neutrons/sec.

Allowing the thermal neutrons to strike the dysprosium plate, the number of radioactive $Dy^{165m}$ nuclei produced in 20 seconds is $$N_r = \frac{I_0}{\lambda_{Dy}}(1-e^{-\Sigma_a D \gamma_d})(1-e^{\lambda D \gamma_r})$$

$$= \frac{7.6013 \times 10^6}{0.09924}(1-e^{-23.0 \times 0.02})(1-e^{0.00924 \times 20})$$

$$= 5.0860 \times 10^7 \text{ radioactive nuclei}$$

For 75 seconds counting, the total number of counts detected is $D = N_r C G$
$D = (5.0860 \times 10^7 \text{ nuclei})(\frac{1}{2} \text{ decaying})(2\pi/4\pi \text{ geometry})$
$= 1.2715 \times 10^7 \text{ counts}$ The standard counting deviation for 95% confidence is $$\text{Percent Standard Deviation} = \frac{3}{\sqrt{1.2715 \times 10^7}} \times 100\%$$

$$= 0.0843\%$$

For 20 seconds counting, $8.5445 \times 10^6$ nuclei will decay, and $(8.5445 \times 10^6)(2\pi/4\pi) = 4.2722 \times 10^6$ counts will be detected for $2\pi$ detecting geometry.

The standard deviation in this case is $$\text{Percent Standard Deviation} = \frac{3}{\sqrt{4.2722 \times 10^6}} \times 100\%$$

$$= 0.1421\%$$

If the enrichment of the plate were to be changed from 1.140% to 1.141%, the number of counts detected should change by approximately 0.001/1.141 or 0.09%. Thus a change from 1.140% to 1.141% enrichment should be detectable above the standard deviation of 0.0843%.

Example III

Assume now that a 90.00% enriched plate having 2% burn-up is to be assayed. In hot fuel assay, the production of $U^{235}$ fission products, plutonium-239, $U^{236}$, and $Pu^{239}$ fission products must be considered.

The macroscopic thermal neutron absorption cross-section of $U^{235}$ in a 90.00% enriched fuel plate after 2% burn-up is:

$$\Sigma_a^{235} = \sigma_a^{235} \frac{N_A \rho_u}{235}(0.9000)(0.98)$$

$$= 29.4088 \text{ cm.}^{-1}$$

The macroscopic thermal neutron absorption cross-section of $U^{238}$ in a 90.00% enriched fuel plate after 2% burn-up is $$\Sigma_a^{238} = \sigma_a^{238} \frac{N_A \rho_u}{238}(0.1000)$$

$$= 0.0133 \text{ cm.}^{-1}$$

The macroscopic thermal neutron absorption cross-section of $U^{235}$ fission products in a 90.00% enriched fuel plate after 2% burn-up is $$\Sigma_a^{f.p.} = (0.011)\Sigma_a^{235}$$

$$= 0.3235 \text{ cm.}^{-1}$$

The production of Pu 239 is related to the burn-up of $U^{235}$ by the ratios of the cross-sections and abundances of $U^{235}$ and $U^{238}$. The relationship is $$Pu^{239} \text{ produced} = U^{235} \text{ burn-up} \frac{(\%U^{238})(\sigma_a^{238})}{(\%U^{235})(\sigma_f^{235})}$$

$$= (0.02)\frac{(0.1)(2.8)}{(0.9)(580)}$$

$$= 0.00001075 \text{ of the original } U^{235}$$

Since the thermal neutron absorption cross-section of $Pu^{239}$ is of the same order of magnitude as that of $U^{235}$ $$(\sigma_a^{Pu} = 1060 \text{ barns})$$

the absorption of thermal neutrons by $Pu^{239}$ may be neglected.

Likewise the effect of the $Pu^{239}$ fission products may be neglected since they will be present in very small quantities.

The production of $U^{236}$ and the effect of $U^{236}$ in the absorption of thermal neutrons may be determined by comparing the thermal neutron capture cross-section of $U^{235}$ to the thermal neutron fission cross-section of $U^{235}$, and by considering the thermal neutron absorption cross-section of $U^{236}$.

The amount of $U^{236}$ produced in a 90.00% enriched fuel plate after 2% burn-up is:

$$U^{236} \text{ produced} = (U^{235} \text{ burn-up}) \frac{\sigma_c^{235}}{\sigma_f^{235}}$$

Where $\sigma_c^{235}$ = microscopic thermal neutron capture cross-section of $U^{235}$ Hence $$\text{the } U^{236} \text{ produced} = (0.02)\frac{112 \text{ barns}}{580 \text{ barns}}$$

$$= 0.00386 \text{ of original } U^{235}$$

Since the thermal neutron absorption cross-section of $U^{236}$ is 6 barns compared to 692 barns for $U^{235}$, the effect of absorption by $U^{236}$ may be neglected.

The thermal neutron absorption cross-section of 90.00% enriched fuel after 2% burn-up is $$\Sigma_a^f = \Sigma_a^{235} + \Sigma_a^{238} + \Sigma_a^{f.p.}$$
$$= (29.4088 + 0.0133 + 0.3235) \text{ cm.}^{-1}$$
$$= 29.7456 \text{ cm.}^{-1}$$

The thermal neutron fission cross-section of the 90.00% enriched fuel after 2% burn-up is $$\Sigma_f^f = \Sigma_f^{235} = \sigma_f^{235} \frac{N_A \rho_u}{235}(0.9000)(0.98)$$

$$= 24.649 \text{ cm.}^{-1}$$

The number of fission neutrons produced per thermal neutron absorbed in the fuel is $$\eta = \nu \frac{\Sigma_f^f}{\Sigma_a^f} = (2.5) \frac{24.649 \text{ cm.}^{-1}}{29.7456 \text{ cm.}^{-1}}$$

$$= 2.072 \text{ fission neutrons produced/absorption}$$

Assuming a thermal neutron flux of $2.5 \times 10^{10}$ thermal neutrons/cm.$^2$/sec. is incident on the fuel plate, the number of thermal neutrons per second absorbed in the fuel is $$N = N_0(1-e^{-\Sigma_a f t})$$
$$= (2.5 \times 10^{10})(1-e^{-29.7456 \times 0.127})$$
$$= 2.4428 \times 10^{10} \text{ neutrons/sec.}$$

The number of fission neutrons per second produced in the fuel is $N_f = N\eta = (2.4428 \times 10^{10})(2.072)$
$= 5.0615 \times 10^{10} \text{ fission neutrons/sec.}$ The fission neutron flux striking the dysprosium plate would be $$\Phi = \frac{S_A}{4} \log_e \left(\frac{R_0^2 + a^2}{a^2}\right)$$

$$= \frac{\frac{5.0615 \times 10^{10} \text{ neutrons/sec.}}{50 \text{ cm.}^{-2}}}{4} \log_e \frac{[(4 \text{ cm.})^2 + (11 \text{ cm.})^2]}{(11 \text{ cm.})^2}$$

$$= 3.1432 \times 10^7 \text{ neutrons/cm.}^2/\text{sec.}$$

The total number of fission neutrons per second striking the dysprosium plate would be $\Phi A = (3.1432 \times 10^7 \text{ nts./cm.}^2/\text{sec.})(50 \text{ cm.}^2)$
$= 1.5716 \times 10^9 \text{ neutrons/sec.}$ Allowing for loss of neutrons during thermalization, the number of thermal neutrons per second striking the dysprosium plate is $I_0 = \frac{1}{10} \Phi A$
$= 1.5716 \times 10^8$ thermal neutrons/sec.

For 20 seconds irradiation of the dysprosium plate, the number of radioactive $Dy^{165m}$ nuclei produced will be $$N_r = \frac{I_0}{\lambda_{Dy}}(1-e^{-\Sigma_a^{Dy}d})(1-e^{-\lambda_{Dy}\tau})$$

$$= \frac{1.5716 \times 10^8}{0.00924}(1-e^{-23.0 \times 0.02})(1-e^{-0.00924 \times 20})$$

$$= (1.700 \times 10^{10})(0.368)(0.168)$$

$$= 1.0510 \times 10^9 \text{ radioactive nuclei}$$

For 75 seconds counting the total number of counts detected over $2\pi$ geometry is $D = N_r CG$
$D = (1.0510 \times 10^9 \text{ nuclei})(\frac{1}{2} \text{ decaying})(2\pi/4\pi \text{ geometry})$
$= 2.6275 \times 10^8$ counts The standard counting deviation to 95% confidence is Percent Standard Deviation =

$$\frac{3}{\sqrt{2.6275 \times 10^8}} \times 100\% = 0.0185\%$$

For 20 seconds counting $1.7657 \times 10^8$ nuclei will decay giving $(1.7657 \times 10^8)(2\pi/4\pi) = 8.8285 \times 10^7$ counts over $2\pi$ geometry.

The standard deviation in this case is

Percent Standard Deviation = $\frac{3}{\sqrt{8.8282 \times 10^7}} \times 100\%$ $= 0.03195\%$ A 90% enriched fuel plate will produce a count of $2.6612 \times 10^8$ counts in a 75-second decay period before it experiences any burn-up. After irradiation to 2% burn-up the total count drops to $2.6275 \times 10^8$ counts in a 75-second decay period. The change in count for a 2% burn-up is then $$\frac{2.6612 \times 10^8 - 2.6275 \times 10^8}{2.6612 \times 10^8} \times 100 = 1.27\%$$

For 0.03% burn-up the decrease in total count should be approximately 0.019%. Hence a burn-up of 0.03% should be detectable above a 75-second count standard deviation of 0.01851%.

Example IV

Assume that a 1.140% enriched plate having 2% burn-up is to be assayed. Again the production of $U^{235}$ fission products, plutonium-239, $U^{236}$, and $Pu^{239}$ fission products must be considered.

The macroscopic thermal neutron absorption cross-section for $U^{235}$ in a 1.140% enriched fuel plate after 2% build-up is $$\Sigma_a^{235} = \sigma_a^{235} \frac{N_A \rho_u}{235}(0.01140)(0.98)$$

$$= 0.3725 \text{ cm.}^{-1}$$

The macroscopic thermal neutron absorption cross-section for $U^{235}$ fission products in a 1.140% enriched fuel plate after 2% burn-up is $\Sigma_a^{f.p.} = (0.011)\Sigma_a^{235}$
$= (0.011)(0.3725) \text{ cm.}^{-1}$
$= 0.0041 \text{ cm.}^{-1}$ The amount of $Pu^{239}$ produced in a 1.140% enriched fuel plate after 2% burn-up is $$Pu^{239} \text{ Production} = \frac{(\%U^{238})(\sigma_a^{238})}{(U^{235})(\sigma_f^{235})}(0.02 \text{ burn-up})$$

$$= \frac{(0.98860)(2.8)}{(0.01140)(590)}(0.20)$$

$$= 0.008373 \text{ of the original } U^{235}$$

The production of $Pu^{239}$ related to the original amount of $U^{238}$ is $$Pu^{239} \text{ Production} = (0.008373)\frac{\text{original } U^{235}}{\text{original } U^{238}}$$

$$= (0.008373)\frac{0.01140}{0.98860}$$

$$= 0.0000965 \text{ of original } U^{238}$$

Since the total plutonium-239 produced is only a small part of the original amount of $U^{235}$ and since only a small part of the $Pu^{239}$ produced will fission (only 2% $U^{235}$ fissioned and its fission cross-section is comparable to that of $PU^{239}$), the effect of $Pu^{239}$ fission products may be neglected.

The effect of absorption by $U^{236}$ may also be neglected since its quantity is only 0.386% that of $U^{235}$ and its absorption cross-section is 6 barns compared to 692 barns for $U^{235}$.

The macroscopic thermal neutron absorption cross-section for $Pu^{239}$ in a 1.140% enriched fuel plate after 2% burn-up is $$\Sigma_a^{239} = \sigma_a^{239}\frac{N_A \rho_u}{238}(0.98860)(0.0000965)$$

$$= (1060 \times 10^{-24} \text{ cm.}^2/\text{nuclei}) \times$$

$$\frac{(6.023 \times 10^{-23} \text{ atoms/mole})(18.8 \text{ g./cm.}^3)(0.98860)(0.0000965)}{238 \text{ g./mole}}$$

$$= 0.00481 \text{ cm.}^{-1}$$

The density of uranium, $\rho_u$, is used in the above equation because the amount of $Pu^{239}$ is related to the original amount of $U^{238}$ by the factor 0.0000965.

The macroscopic thermal neutron absorption cross-section for $U^{238}$ in a 1.140% enriched fuel plate after 2% burn-up is $$\Sigma_a^{238} = \sigma_a^{238}\frac{N_A \rho_u}{238}(0.98860)(1-0.0000965)$$

$$= 0.1317 \text{ cm.}^{-1}$$

The macroscopic thermal neutron absorption cross-section for the fuel is then $\Sigma_a^t = \Sigma_a^{235} + \Sigma_a^{239} + \Sigma_a^{238} + \Sigma_a^{f.p.}$
$= (0.3728 + 0.0048 + 0.1317 + 0.0041) \text{ cm.}^{-1}$
$= 0.5131 \text{ cm.}^{-1}$ The macroscopic thermal neutron fission cross-section of the fuel is the sum of the fission cross-section for $U^{235}$ and $Pu^{239}$.

$$\Sigma_f^t = \Sigma_f^{235} + \Sigma_f^{239}$$

The macroscopic thermal neutron fission cross-section for $U^{235}$ in a 1.140% enriched fuel plate after 2% burn-up is $$\Sigma_f^{235} = \sigma_f^{235}\frac{N_A \rho_u}{235}(0.01140)(0.98)$$

$$= 0.3122 \text{ cm.}^{-1}$$

The macroscopic thermal neutron fission cross-section for $Pu^{239}$ in a 1.140% enriched fuel plate after 2% burn-up is $$\Sigma_f^{239} = \sigma_f^{239}\frac{N_A\rho_u}{238}(0.98860)(0.000065)$$

$$= (750 \times 10^{-24} \text{ cm.}^2/\text{nuclei}) \times$$

$$\frac{(6.023 \times 10^{23} \text{ atoms/mole})}{238 \text{ g./mole}}$$

$$= 0.0034 \text{ cm.}^{-1}$$

The macroscopic thermal neutron fission cross-section of the fuel is then $$\Sigma_f{}^f = \Sigma_f{}^{235} + \Sigma_f{}^{239}$$
$$= (0.3122 + 0.0034) \text{ cm.}^{-1}$$
$$= 0.3156 \text{ cm.}^{-1}$$

The number of fission neutrons produced per thermal neutrons absorbed in the fuel is $$\eta = \nu\frac{\Sigma_f{}^f}{\Sigma_a{}^f} = (2.5)\frac{(0.3156) \text{ cm.}^{-1}}{(0.5131) \text{ cm.}^{-1}}$$

$$= 1.5377 \text{ fission neutrons produced/absorption}$$

The number of thermal neutrons per second absorbed in the fuel is $$N = N_0(1 - e^{-\Sigma_a{}^f})$$
$$= (2.5 \times 10^{10})(1 - e^{-0.5131 \times 0.127})$$
$$= 1.57685 \times 10^9 \text{ thermal neutrons/sec.}$$

The number of fission neutrons produced per second in the fuel is $$N_f = N\eta = (1.57685 \times 10^9)(1.5377)$$

The fission neutron flux striking the dysprosium plate would be $$\Phi = \frac{S_A}{4}\log_e\left(\frac{R_0^2 + a^2}{a^2}\right)$$

$$= \frac{\frac{2.42472 \times 10^9 \text{ neutrons/sec.}}{50 \text{ cm.}^2}}{4}\log_e$$

$$\left[\frac{(4 \text{ cm.})^2 + (11 \text{ cm.})^2}{(11 \text{ cm.})^2}\right]$$

The total fission neutrons per second striking the plate would be $$\Phi A = (1.50575 \times 10^6 \text{ nts./cm.}^2/\text{sec.})(50 \text{ cm.}^2)$$

$$= 7.52875 \times 10^7 \text{ nts./sec.}$$

Allowing for loss of neutrons during thermalization, the number of thermal neutrons per second striking the dysprosium plate is $$I_0 = \frac{1}{10}\Phi A$$

$$= 7.52875 \times 10^6 \text{ thermal neutrons/sec.}$$

Allowing the thermal neutrons to strike the dysprosium plate, the number of radioactive $Dy^{165m}$ nuclei produced in 20 seconds will be $$N_\tau = \lambda\frac{I_0}{D_y}(1 - e^{-\Sigma_a D_{y_x}})(1 - e^{-\lambda D_y\tau})$$

$$= \frac{7.52875 \times 10^6}{0.00924}(1 - e^{-23.0 \times 0.02})(1 - e^{-0.00924 \times 20})$$

$$= (8.14799 \times 10^8)(0.368)(0.168)$$

$$= 5.0374 \times 10^7 \text{ radioactive nuclei}$$

For 75 seconds counting, the total number of counts detected over $2\pi$ geometry is $$D = N_\tau CG$$
$$= (5.0374 \times 10^7 \text{ nuclei})(\frac{1}{2} \text{ decaying})(2\pi/4\pi \text{ geometry})$$
$$= 1.25935 \times 10^7 \text{ counts}$$

The standard counting deviation to 95% confidence is $$\text{Percent Standard Diviation} = \frac{3}{\sqrt{1.25935 \times 10^7}} \times 100\%$$

$$= 0.0845\%$$

For 20 seconds counting, $8.4628 \times 10^6$ nuclei will decay, and $(8.4628 \times 10^6)(2\pi/4\pi) = 4.2314 \times 10^6$ counts will be detected over $2\pi$ geometry.

The standard counting deviation in this case is $$\text{Percent Standard Deviation} = \frac{3}{\sqrt{4.2314 \times 10^6}} \times 100\%$$

$$= 0.1459\%$$

A 1.140% enriched unirradiated fuel plate will produce a dysprosium—165m count of $1.2714 \times 10^7$ counts for 75 seconds $Dy^{165m}$ decay. After irradiation to 2% burn-up the total count drops to $1.25935 \times 10^7$ counts for 75 seconds decay. The change in count for 2% burn-up is then $$\frac{1.2715 \times 10^7 - 1.25935 \times 10^7}{1.2715 \times 10^7} \times 100 = 0.954\%$$

For 0.20% burn-up the decrease in total count should be approximately 0.0954%. Hence, for a 75-second counting period a burn-up of approximately 0.20% should be detectable above the standard deviation of 0.0845%.

In operation, and with reference to the drawing, and the examples, the fuel plate under test is subjected to a thermalized neutron beam whereby fission of $U^{235}$ in the fuel plate occurs. A cadmium plate or shield is provided to filter or contain the original thermalized neutron beam while the fission neutrons are thermalized preferably by heavy water, although water is also useful as a moderator. The thermalized fission neutrons then strike a dysprosium plate of optimum thickness whereby the fission neutrons are captured resulting in activation of the dysprosium. The beta-gamma activity is then measured and correlated to determine the content of the fuel plate under test. Thus provided is an accurate, non-destructive method of assaying nuclear fuel.

The present invention, therefore, is well adapted to carry out the objects and attain the ends and advantages mentioned as well as others inherent therein. While a presently preferred embodiment of the invention has been given for the purpose of disclosure, numerous changes in the details of construction and the combination, shape and size and arrangement of parts may be resorted to without departing from the spirit and scope of the invention as hereinafter claimed.

What is claimed is:
1. An improved method of non-destructively assaying nuclear fuel containing $U^{235}$ including,
   directing a thermal neutron beam to the fuel under test whereby fission neutrons are produced in proportion to the amount of $U^{235}$ present in the fuel,
   eliminating thermal neutrons of the original beam transmitted through the fuel under test,
   thermalizing the fission neutrons,
   activating a dysprosium plate with the thermalized fission neutrons, and
   measuring the activity of the dysprosium plate.
2. The invention of claim 1 wherein the thermal neutrons of the original beam transmitted through the fuel under test are eliminated by a cadmium shield.
3. The invention of claim 1 wherein the fission neutrons are thermalized by a moderator selected from the group consisting of heavy water and water.
4. The invention of claim 1 wherein activity of the dysprosium plate is measured by gamma scintillation detection.
5. The invention of claim 1 wherein
   thermal neutrons of the original beam transmitted through the fuel under test are eliminated by a cadmium shield,
   the fission neutrons are thermalized by a moderator se- lected from the group consisting of heavy water and water, and activity of the dysprosium plate is measured by gamma scintillation detection.

References Cited
UNITED STATES PATENTS

| | | | |
|---|---|---|---|
| 2,845,544 | 7/1958 | Seaborg et al. | 250—83.1 |
| 2,971,094 | 2/1961 | Title | 250—83.1 |
| 3,141,092 | 7/1964 | Weinberg | 250—83.1 X |
| 3,222,521 | 12/1965 | Einfeld | 250—83.1 |

RALPH G. NILSON, *Primary Examiner.*

A. B. CROFT, *Assistant Examiner.*

U.S. Cl. X.R.

250—83